United States Patent [19]

Knapp et al.

[11] Patent Number: 4,805,661
[45] Date of Patent: * Feb. 21, 1989

[54] FAUCET VALVE WITH ANTI-SIPHON BACK FLOW PREVENTER

[75] Inventors: Alfons Knapp, Biberach an der Riss, Fed. Rep. of Germany; Robert D. Roland, Zionsville; Joe D. Hutto, Indianapolis, both of Ind.

[73] Assignee: Masco Corporation of Indiana, Taylor, Mich.

[*] Notice: The portion of the term of this patent subsequent to Sep. 29, 2004 has been disclaimed.

[21] Appl. No.: 71,640

[22] Filed: Jul. 9, 1987

Related U.S. Application Data

[63] Continuation of Ser. No. 805,280, Dec. 5, 1985, Pat. No. 4,696,322.

[51] Int. Cl.[4] ............................................. F16K 24/02
[52] U.S. Cl. ................................. 137/218; 137/217; 137/625.41; 137/854
[58] Field of Search ................... 137/217, 218, 614.17, 137/625.41, 854

[56] References Cited

U.S. PATENT DOCUMENTS

| | | |
|---|---|---|
| 2,133,804 | 10/1938 | Brooks . |
| 2,584,436 | 2/1952 | Donaldson . |
| 2,927,598 | 3/1960 | Thompson . |
| 3,056,418 | 10/1962 | Adams et al. .................. 137/217 X |
| 3,104,674 | 9/1963 | Bills et al. . |
| 3,172,426 | 3/1965 | Cole ................................ 137/636.4 |
| 3,416,556 | 12/1968 | Nelson . |
| 3,424,188 | 1/1969 | Whitaker et al. . |
| 3,454,032 | 7/1969 | Hinz et al. ............................ 137/218 |
| 3,470,898 | 10/1969 | Langdon . |
| 3,565,097 | 2/1971 | Costa . |
| 3,713,457 | 1/1973 | McInnis et al. . |
| 3,967,638 | 7/1976 | Tondreau . |
| 4,008,732 | 2/1977 | Fichter et al. . |
| 4,287,905 | 9/1981 | Iglesius . |
| 4,410,001 | 10/1983 | Goguen ........................ 137/218 X |
| 4,553,560 | 11/1985 | Tucker et al. ...................... 137/218 |
| 4,630,643 | 12/1986 | Lorch ......................... 137/625.41 X |
| 4,696,322 | 9/1987 | Knapp et al. ...................... 137/218 |

Primary Examiner—Gerald A. Michalsky
Attorney, Agent, or Firm—Steven L. Permut; Malcolm L. Sutherland

[57] ABSTRACT

A faucet valve 10 includes a ball valve 28 seated in a valve chamber 18. The ball valve 28 has a plurality of apertures 46 circumferentially spaced about the control stem 32 which extends through an opening 60 in the cap assembly 48 of the valve housing 16. A check valve 66 is formed within the hollow interior 62 of the ball valve and includes a disc section 70 that mounts a flap valve 78. A shield formed by a cylindrical wall 80 downwardly depending from the disc section 70 and a snap ring 84 fitted on the lower end of the cylindrical wall protects the flap valve from undue water turbulence. Negative pressure in the supply inlet opens the flap valve 78 to draw air through passageway 64 formed by the apertures 46 and auxiliary opening 60 and hollow interior 62 of the ball valve seated in the valve chamber 18.

4 Claims, 2 Drawing Sheets

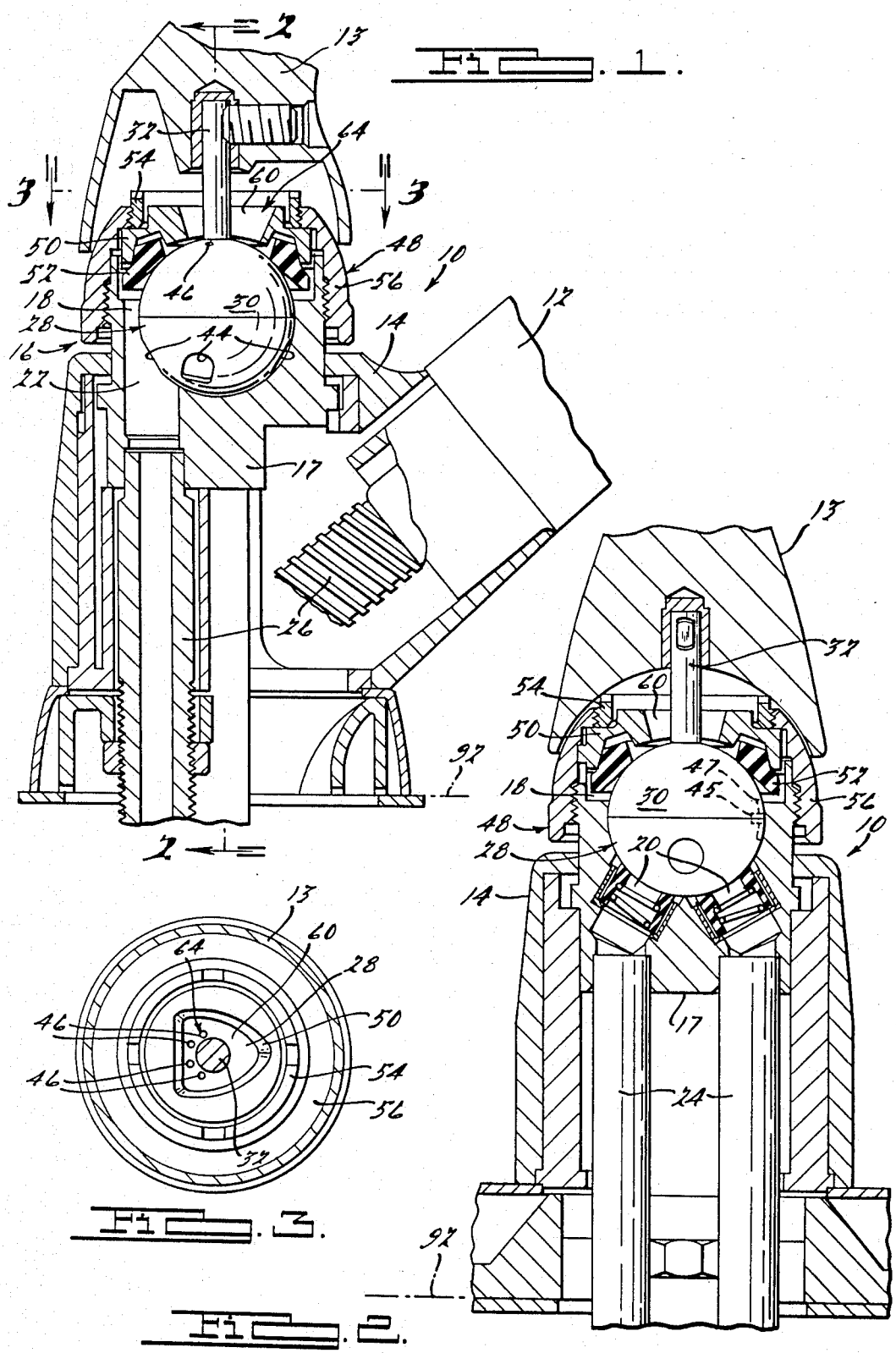

FAUCET VALVE WITH ANTI-SIPHON BACK FLOW PREVENTER

This is a continuation of application Ser. No. 805,280, filed Dec. 5, 1985, now U.S. Pat No. 4,696,322.

TECHNICAL FIELD

This invention relates to faucet valves and more particularly to faucet valves integrated with an anti-siphon back flow preventer.

BACKGROUND OF THE INVENTION

Vacuum breaker mechanisms have long been associated with plumbing fixtures to prevent back flow conditions if per chance the water supply pressure becomes negative and the water supply outlet, commonly a hand-held spray spout, is simultaneously submerged in a basin of water. Commonly, the vacuum breaker is in-line with the water supply pipes. However, in-line vacuum breakers are disadvantageous in that their often bulky housing is difficult to conceal and, if they need replacement, require a major plumbing effort. One must break the supply line, remove the housing, replace the housing and reconnect the replacement to the supply lines.

Moreover, vacuum breakers to be effective against anti-siphoning need to be positioned above the sink top commonly referred to as the flood level. With modern plumbing, often the supply lines are concealed below the sink. As such, an extra supply line needs to be detoured above the flood level. Furthermore, the vacuum breaker housing is hard to conceal above the flood level and presents an unsightly appearance in contrast to an often elegant faucet.

What is needed is an anti-siphon breaker valve that can be incorporated into conventional faucet housings so that the air vent is positioned above the flood level and yet be concealed within the faucet. The faucet housing should also have no more openings thereto than a conventional housing. It is also desired to use a conventional valve system that includes supply inlets with valve seats therein and a rigid movable valve member which can selectively cover over the supply inlets to selectively close off or open the supply inlets to an outlet. Furthermore, it is desired to have an easily replaceable vacuum breaker valve.

SUMMARY OF THE INVENTION

In accordance with the invention, a faucet valve includes a housing having a valve chamber, at least one supply inlet and a supply outlet in communication with the valve chamber. A rigid movable valve element is mounted within the valve chamber and is operably movable to selectively cover and uncover the supply inlets and to open and close communication to the supply outlet. Furthermore, the housing includes an auxiliary opening to the valve chamber in communication with a passage that extends through the movable valve element. The auxiliary opening and passage form an anti-siphon passageway that has a distal end that is open to the atmosphere. The end preferably also receives a control stem for the valve element. A one way check valve is mounted within the passageway to prevent fluid from passing from the supply inlets to and through the auxiliary opening.

Preferably, the rigidly movable valve element is a ball valve and the ball vale has a control stem that extends out through the auxiliary opening in the housing. The one way check valve acts in cooperation with the ball valve to prevent leakage thrugh the auxiliary opening about the control stem.

Preferably, the passageway includes apertures which extend through the ball section of the ball valve. The apertures preferably are circumferentially spaced about the control stem and adjacent thereto. Furthermore, the control stem has a base section secured to the interior portion of the ball valve and the apertures extend through the base portion.

The check valve is preferably mounted within the ball valve. The check valve includes a disc section having an outer periphery sealingly and rigidly attached to the interior wall of the ball valve such that the apertures are located on one side of the ball valve and the valve ports of the ball valve are located on another side with respect to the disc section. The disc section has an aperture therethrough and an elastomeric resilient flap valve is mounted to normally cover the aperture through the disc section to prevent hydraulic fluid from the supply inlets from leaking through the valve ports and through the check valve to the apertures in the ball valve and through the auxiliary opening in the housing. Preferably, the disc section has a cylindrical wall downwardly extending from the disc section and a plastic annular disc having a central aperture is fitted at the lower end of the cylindrical wall below the flap valve to form a shield to reduce the chance that turbulence of the water flowing from the valve supply inlets through the valve ports in the ball valve and to the valve outlet will disturb the check valve.

In accordance with the broader aspects of the invention, a housing has a valve chamber and at least one supply inlet and a supply outlet in communication with the valve chamber. A valve assembly is fitted within the valve chamber and includes a rigid movable valve element for selectively covering and uncovering the supply inlets to open and close communication between the supply inlets and the supply outlet. The housing also includes auxiliary opening to the valve chamber in communication with a passage through the valve assembly to form an anti-siphon air passageway. The one way check valve is mounted within the air passageway to prevent hydraulic fluid from passing from the supply inlets to the auxiliary opening. Furthermore, it is preferable that the rigid movable valve element is controlled by a control lever which extends through the auxiliary opening.

BRIEF DESCRIPTIION OF THE DRAWINGS

Reference now will be made to the accompanying drawings in which

FIG. 1 is a segmented side elevational view of a faucet with a faucet valve according to the invention;

FIG. 2 is a segmented view of the faucet valve taken at right angles from the view shown in FIG. 1;

FIG. 3 is a cross-sectional view taken along line 3—3 in FIG. 1;

DETAILED DESCRIPTION OF THE PREFERRED EMBODIMENT

Figure 4:
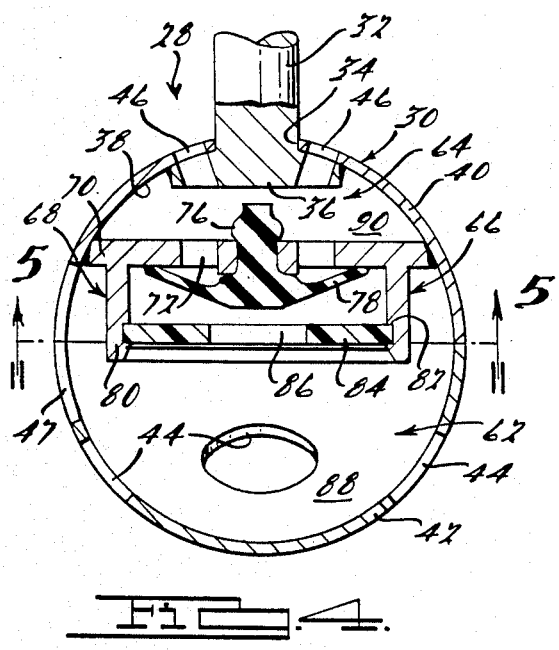
FIG. 4 is an elevational cross-sectional view of the ball valve shown in FIG. 1.

Referring to FIGS. 1 and 2, a faucet 10 includes a faucet spout 12 and operable handle 13. The spout 12 is removably mounted to an escutcheon 14 which is mounted about a lower housing section 17 of housing 16. The faucet valve housing 16 has a valve chamber 18 with two supply inlets 20 and a supply outlet 22. The supply inlets are connected to supply pipes 24. The supply outlet 22 is connected to the spout 12 through a flexible tube 26. Within the valve chamber 18 is mounted a ball valve 28.

Figure 6:
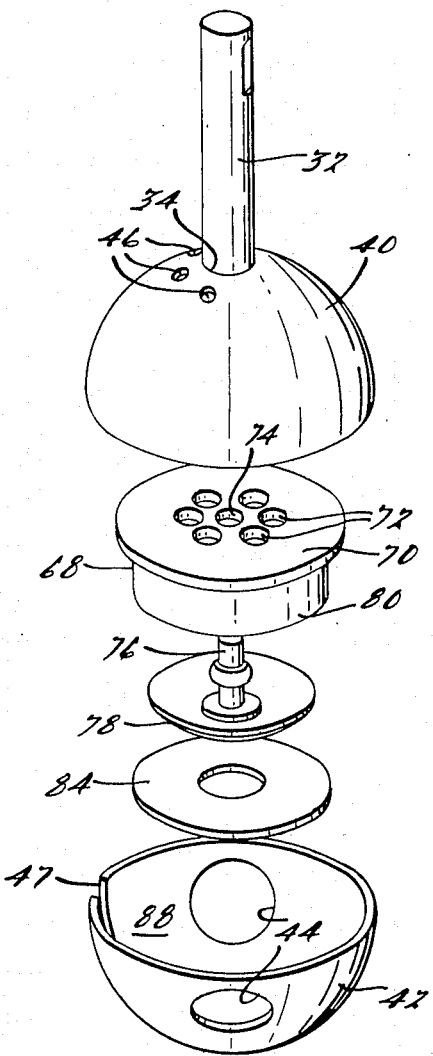
FIG. 6 is an exploded perspective view of the ball valve.

As shown in more detail in FIGS. 4 and 6, the ball valve has a ball section 30 and a control stem 32. The ball section 30 comprises two halves 40 and 42 made from stainless steel. Ball half 42 has a plurality of valve ports 44 therethrough. The valve ports can be selectively aligned or misaligned with both supply inlets 20 and in communication with supply outlet 22 to selectively close or open the supply inlets to the supply outlet. When closed, the ball half 42 has its surface sealingly covering supply inlets. Ball half 40 has the control stem 32 rigidly secured thereto. The control stem 32 passes through an aperture 34 and has a larger base section 36 welded to the interior wall 38 of the ball section 30. A plurality of vent apertures 46 pass through ball half 40 and base 36 of stem 32.

As shown in FIGS. 1 and 2, the ball valve is fitted in chamber 18 of the housing 16. The ball valve is positioned correctly by a positioning post 45 extending from section 17 and fitting in slot 47 in ball 30. A cap assembly 48 of the housing 16 includes an upper valve seat 50, a sealing ring 52, adjusting ring 54, and a screw cover 56 which screws on the external portion of the lower section 17. The valve housing 16 is conventional in structure and is presently in production and found in the Delta single handle kitchen faucet.

The cap assembly 48 forms an auxiliary opening 60 which receives control stem 32. The vent apertures 46 as shown in FIG. 3 are circumferentially spaced about the control stem and are in communication with the auxiliary opening 60 and with the hollow interior 62 of the ball section 30 to form an anti-siphon air passageway 64.

The vent apertures 46 are adjacent the control stem 32 such that the vent apertures 46 are always in communication with the auxiliary opening 60 independent of the operable position of the control stem and to assure that the vent apertures 46 are in communication with the auxiliary opening 60 particularly when the control valve is in the open position.

Figure 5:
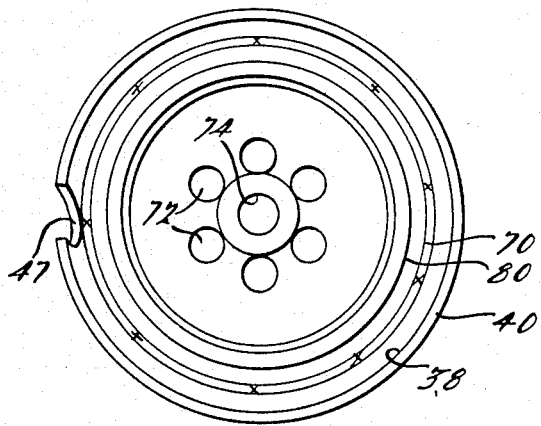
FIG. 5 is a bottom partially assembled view of the ball valve.

Referring to FIGS. 4, 5 and 6, a check valve 66 is mounted within the hollow interior 62 to allow air to pass from the auxiliary opening 60 through the passageway 64 into the supply inlets 20 while preventing fluid from the supply inlets passing through to the auxiliary opening 60. The check valve includes a cup-shaped member 68 that has a disc section 70 sealingly welded at its periphery to the top half 40 of the ball valve 28. The disc section has a plurality of apertures 72 and a central mounting aperture 74. A central mounting aperture receives a stem 76 of flap valve 78. The flap valve 78 covers the aperture 72 to allow the flow as above described. The cup-shaped member 68 also has a cylindrical wall 80 surrounding the flap valve. The cylindrical wall has an annular groove 82 which can receive the annular plastic snap ring 84. The plastic snap ring has a central aperture 86. The snap ring 84 and cylindrical wall 80 form a shield for the flap valve to reduce turbulence from disturbing the flap valve 78 as fluid flows from the supply inlets 20 through the valve ports 44 and out through the supply outlet 22.

The ball valve 28 is assembled by having two halves 40 and 42 stamped. The control stem 32 is then passed through aperture 30 for the top half and welded and has its base section 36 welded in place. The vent apertures 46 are then drilled about the control stem 32. Cup-shaped member 68 is then welded in place in the top half 40 as shown in FIG. 5. Flap valve 78 has a stem snap-fitted into the central mounting aperture 74. The snap ring 84 is then snapped in place and the lower half 42 is then welded to the top half in the appropriate position to form the complete ball valve 28. The ball valve is then mounted in the ball valve chamber in conventional fashion with the cap assembly 48 screwed onto the lower housing section 58. Conventional one way check valves, such as duck bill flap valves, are optionally placed in each supply pipe 24 to reduce vacuum pull through the ball valve 28.

In operation, the ball valve 28 operates as a conventional ball valve by selectively being operable via the valve handle 13. The valve ports 44 can be selectively positioned to either cover or uncover both supply inlets to control volume and the mix from both inlets passing through the lower half 88 of the hollow interior 62 and then out through an additional valve port 44 and through the supply outlet 22.

If per chance there is a negative pressure in the supply inlets and the valve is turned on, the negative pressure will open the flap valve 78 such that air can pass through the passageway 64 formed by the auxiliary opening 60, the top half 90 of the hollow interior 62 to the lower half 88 of the hollow interior 62, and through the valve ports 44 to the supply inlets 20. Furthermore, if there is a slight vacuum pressure still exerted on supply outlet 22, the height of the supply outlet 22 is significantly higher than the flood plane indicated at 92 so that the risk of having any water being siphoned back through the supply outlet is reduced significantly.

If the ball valve 28 needs replacing, it can be replaced in the conventional fashion by merely removing handle 13 from the control stem 32 and unscrewing the cap assembly 48 ater the water supply has been shut off. The ball valve 28 can then be removed and replaced by a new ball valve 28 with the cap assembly 48 secured back onto the lower housing section 58 and the handle 13 secured to the control stem 32.

In this fashion, a faucet spout that requires a vacuum breaker can incorporate the vacuum breaker in the conventional housing with no changes in the escutcheon or increased size of the valve housing 16. Furthermore, the position of the vacuum breaker is sufficiently high to reduce the risk of back siphoning and is easily replaceable by merely replacing the ball valve element 28. Furthermore, the vacuum breaker is sealed against leakage. Furthermore, the vacuum breaker passageway is formed with no additional openings into the valve housing because the opening that receives the control stem functions additionally as part of the air passageway into the valve housing chamber.

Variations can be made without departing from the scope and spirit of the invention as defined in the appended claims.

The embodiments of the invention in which an exclusive property or privilege is claimed are defined as follows:

1. A faucet mixing valve characterized by:
   a housing having a valve chamber and two supply inlets for hot and cold water in communication with said valve chamber, respectively, and a supply outlet having one end adjacent to said valve chamber directly exiting from said valve chamber;
   a rigid movable valve element within said valve chamber operably movable to selectively cover and uncover said two supply inlets and closing and opening communication to said supply outlet from either of said two supply inlets;
   said housing including an auxiliary opening to said valve chamber in parallel to said supply outlet and in communication with a passage through said movable valve element forming an anti-siphon air passageway that is parallel and independent of said supply outlet;
   said air passageway having its distal end open to the atmosphere and is independent of said supply outlet;
   a one way check valve mounted within said air passageway to prevent fluid from either of said two supply inlets from exiting said auxiliary opening but allowing air to enter from said auxiliary opening into said air passageway and bypassing said supply outlet.

2. A faucet characterized by:
   a housing having a valve chamber and at least one supply inlet and a supply outlet directly exiting from said valve chamber;
   rigid movable valve element within said valve chamber operably movable to selectively cover and uncover said at least one supply inlet and closing and opening communication to said supply outlet;
   said housing including an auxiliary opening in selective direct communication with said valve chamber being parallel and independent of said supply outlet and in communication with a passage through said movable valve element forming an anti-siphon air passageway that is parallel and independent of said supply outlet;
   said air passageway having its distal end open to the atmosphere and parallel and independent of said supply outlet;
   a one way check valve mounted within said air passageway to prevent fluid from said at least one supply inlet from exiting said auxiliary opening but allowing air to enter said air passageway with said air bypassing said supply outlet; and
   said rigid movable valve element being a ball valve.

3. A faucet mixing valve characterized by:
   a housing having a valve chamber, two supply inlets for hot and cold water, respectively, and a supply outlet in direct communication with said valve chamber;
   a valve assembly fitted within said valve chamber and including a rigid movable valve element for selectively covering and uncovering said two supply inlets and closing and opening communication between either of said two supply inlets and said supply outlet;
   said housing including an auxiliary opening in selective direct communication with said valve chamber being parallel to and independent of said supply outlet and in communication with a passage through said valve assembly forming an anti-siphon air passageway that is parallel and independent of said supply outlet;
   said air passageway having its distal end open to the atmosphere and independent of said supply outlet;
   a one way check valve mounted within said air passageway to prevent hydraulic fluid from either of said two supply inlets from exiting said auxiliary opening but allowing air to enter said air passageway bypassing said supply outlet.

4. A faucet assembly characterized by:
   a housing having a valve chamber and two supply inlets for hot and cold water in communication with said valve chamber, respectively, and a supply outlet directly exiting from said valve chamber;
   a rigid movable valve element within said valve chamber operably movable to selectively cover and uncover said two supply inlets and closing and opening communication to said supply outlet from either of said two supply inlets;
   a spout removably mounted to said housing and in fluid communication with said supply outlet;
   said housing including an auxiliary opening to said valve chamber in parallel to said supply outlet and in communication with a passage through said movable valve element forming an anti-siphon air passageway that is parallel to and independent of said supply outlet and spout; and
   a one way check valve mounted within said air passageway to prevent fluid from either of said two supply inlets from exiting said auxiliary opening but allowing air to enter from said auxiliary opening into said air passageway and bypassing said supply outlet.

* * * * *